Patented Sept. 16, 1924.

1,508,777

UNITED STATES PATENT OFFICE.

ALFRED H. COWLES, OF SEWAREN, NEW JERSEY, ASSIGNOR TO THE ELECTRIC SMELTING & ALUMINIUM COMPANY, OF SEWAREN, NEW JERSEY.

PROCESS FOR PRODUCING AND UTILIZING ALKALIES AND ALUMINA.

No Drawing.    Application filed November 20, 1915. Serial No. 62,486.

*To all whom it may concern:*

Be it known that I, ALFRED H. COWLES, a citizen of the United States, and resident of Sewaren, in the county of Middlesex and State of New Jersey, have invented certain new and useful Processes for Producing and Utilizing Alkalies and Alumina, of which the following is a specification.

The object of the invention is to furnish a process for obtaining from compounds or mixtures containing chemically combined or otherwise, alumina, alkali metal oxide, silica and lime, the constituents that form alkali metal aluminate from which alumina, and caustic alkali or alkali carbonates may be separated. At the same time there is secured a residue, or insoluble product, that can be employed in the manufacture of sand-lime bricks, in lieu of lime, and some silica; or in the manufacture of cement, by the addition of one molecule of lime to the calcium oxide therein.

The substances to be treated can be any mixture, natural or artificial, which when charged in a furnace shall give a sintered or fused product containing, as closely as can be attained, such proportions of oxides as shall be equivalent to the molecular weight of two molecules of an alkali earth oxide (preferably lime CaO) to one molecule of silica ($SiO_2$), and less than approximately one and seventy-six hundredths molecules of an alkali metal oxide ($Na_2O$ or $K_2O$) to one molecule of alumina ($Al_2O_3$). The presence of iron oxide, titanic oxide and some others, does not interfere with the process; they may, or may not be present, since they are practically insoluble under conditions of leaching to be hereafter described. If alkaline earth oxides are present as constituents or impurities in the above minerals or mixtures, they can be allowed for in forming the mixtures.

In making my invention I have availed myself of the known fact that if two molecules of soda ($Na_2O$) and two molecules of lime (CaO) are combined with one molecule each of the acid compounds alumina and silica or very nearly in that ratio, there is formed by sintering or fusion a product from which nearly all of the dialkali, for example, di-sodium aluminate, ($Na_2O)_2$-$Al_2O_3$, can be leached away from the orthosilicate of calcium ($SiO_2$2CaO) or di-calcium silicate $(CaO)_2SiO_2$. (See U. S. Patent No. 708,561, of Sept. 9th, 1902 to Kayser.) And I have discovered that in a sintered or melted mixture I can successfully leach away alkali metal aluminate when the molecular weight ratio of alkali metal oxide, $Na_2O$ or $K_2O$ to alumina ($Al_2O_3$) molecules is considerably lower than two molecules of alkali metal oxide to one molecule of alumina, leaving the di-calcium silicate, or ortho silicate of calcium ($SiO_2$2CaO) as the residue containing small amounts of alumina and alkali metal oxide ($Na_2O,K_2O$) and insoluble impurities such as iron oxide, etc. The liquor that I thus secure is a solution of alkali metal aluminate much more suited for the manufacture of pure alumina and pure alkali than that obtained by the employment of even one and seventy-six hundredths molecules of alkali metal oxide to one of alumina. In order to accomplish this result, it is desirable that the sintered product, which is secured, should immediately be leached and not given time to absorb carbonic acid and water from the atmosphere. With this precaution taken, a ratio of sodium metal oxide, for example, and alumina in the sintered mixture containing as low as 1.1 molecules of sodium oxide ($Na_2O$) to one molecule of alumina has been leached by me and very satisfactory results secured, though the leaching is somewhat more rapid, if the alkali metal oxide be slightly increased (but it should not be increased to above one and seventy-six hundredths molecules of alkali metal oxide to one molecule of $Al_2O_3$ in the solution). The solution when so rich in alkali metal oxide becomes one of inferior value for use in separating the alumina from the alkali metal oxide, following the lines of the well known Bayer process. See U. S. Patents 382,505 of May 8, 1888, and 515,896 of Mar. 6, 1894. This process, as is well known, produces alumina of the highest purity and in a form to be readily washed and left free from caustic soda, or carbonate of soda, the presence of which impurities greatly decreases the value of the alumina produced for the manufacture of the metal aluminum. Herein lies the great and important use for alumina.

In operating the Bayer process, I have found that the larger the percentage of alkali metal oxide in the alkali metal aluminate solution, the slower the process, and the less the proportion of alumina crystals that separates from the solution during standing, or during agitation of the solution. Therefore the alkali metal aluminate solution should be as low in alkali content as is consistent with the previous leaching process involved in securing it. Two molecules of alkali metal oxide to one molecule of $Al_2O_3$ is too high. The $Al_2O_3$ that will voluntarily precipitate becomes only one-half as much as when one molecule of $Na_2O$ or alkali metal oxide to one of $Al_2O_3$ is present under like conditions of temperature and density of solution. The liquor left after precipitation of alumina by the Bayer process contains from 5 to 7 molecular weights of $Na_2O$ to one molecular weight of $Al_2O_3$. The less the quantity of this liquor, the less reagent is required to remove the $Al_2O_3$ and produce a pure caustic solution. If the liquor is of twice the quantity, as when two molecules of sodium metal oxide to one alumina are used, then twice the $Al_2O_3$ remains with the liquor, and twice the reagent is required for precipitation, and the quantity of the material thus precipitated and which must be submitted to treatment leads to prohibitive costs and additional losses. Herein lies the importance of employing in the mixture that I charge to a furnace a smaller ratio of alkali metal oxide to alumina than that mentioned in the above referred to patent to Kayser, as well as my published papers of 1912 before the Eighth International Congress of Applied Chemistry, volume 25, page 119 and before a joint meeting of the American Electrochemical Society, etc., printed in the Journal of Industrial and Engineering Chemistry, volume 5, No. 4, April, 1913.

Having thus described my discovery and set forth the advantages gained thereby over what is well known in the chemistry of the art, I will now describe how the invention and its discovered application may be employed.

I take an alkali silico aluminate such as leucite, orthoclase or zeolite, or mixed materials containing an oxide of an alkali metal, alumina, and silica and determine their exact chemical composition. They may be made artificially from salt, clay and steam by methods described in patents already issued to me, (Nos. 1,040,893 and 1,040,894 dated October 8, 1912, 1,123,693 dated January 5, 1915 and to Kayser and Cowles No. 1,041,599 dated October 15, 1912) or they may be secured as minerals, or their equivalents may be secured by mixtures of minerals that occur largely in nature, with alkali metal carbonates. It is desirable to select such minerals as will enable one to secure an alkali-silico aluminate that contains as low an amount of silica as is practically securable, for, when the mixture is made for treatment, there must be proportioned to each molecule of silica in the mixture two molecular weights of calcium oxide, or its equivalent calcium carbonate, etc. The lower the silica content, the less the calcium oxide needed, and the less bulky is the final product to be leached.

An artificial sodic-silico-aluminate of the composition $(Na_2O)_{1.4}2SiO_2·Al_2O_3$, made by me on a large scale, and containing but two molecules of silica, works well. To this mixture 4 molecular equivalents of lime, or calcium carbonate must be added in preparing the mixture for sintering.

The mineral "leucite," quite common in nature has, when pure, the formula $K_2OAl_2O_3·4SiO_2$. This mineral should be ground with two molecular equivalents by weight of lime (CaO) to each single molecular equivalent by weight of silica in its composition. To prepare this mixture for sintering, it is desirable to add a fraction less than seventy-six hundredths and more than one-tenth of an alkali metal carbonate molecule, or its equivalent to each molecule of alumina in the mixture, when excellent results will be attained.

In case a mixture of clay and calcium carbonate, sodium carbonate and silica is used, the carbonic acid is driven off from the calcium carbonate and the alkali metal carbonate during heating, and the mixture should be so formed that the sintered product contains, as nearly as possible, two molecules of calcium oxide to one molecule of silica, in their molecular weight proportions, while the alkali metal oxide should be preferably sufficiently above the ratio of one molecular weight of the same to one of alumina that the sintered product, even without boiling and at ordinary temperature will freely leach, and that such leaching shall not be interfered with by the absorption of carbonic acid gas from the atmosphere. This ratio should not be above one and seventy-six hundredths molecules of the alkali metal oxide to one of alumina for reasons given above. A ratio of 1.5 of alkali metal oxide to one of alumina in the product formed gives good results.

Just in proportion as we increase the ratio, the difficulties of recovering the pure alumina from the alkali metal aluminate solution greatly increase and render the process one that departs from practical utility, in the manufacture of alumina, according to the general principle of the Bayer process.

Some of the alkali metal zeolites are preferable in forming the mixture, to the alkali metal feldspars, such as orthoclase and albite, since they can be found containing much less silica in their composition than the feldspars. I have found, however, that the process works very satisfactorily upon orthoclase feldspar, the composition of which, when pure, is $K_2OAl_2O_36SiO_2$. To such a feldspar, again, there should be added two molecular weights of calcium oxide, or calcium carbonate to each molecular weight of silica in its composition, and it is preferable to add a fraction less than seventy-six hundredths of a molecule of an alkali metal hydroxide or carbonate to each molecule of alumina.

If free silica is present in any of these minerals mentioned, sufficient calcium carbonate or lime should be added in excess to allow for such free silica and to combine one molecular weight of it with two molecular weights of calcium oxide.

Having once determined the exact composition of the above minerals, mixtures of them may be employed, since one can always add sufficient calcium oxide, calcium carbonate, or other alkali earth metal oxide or calcium salts to give in the product two molecular weights of calcium oxide, the preferred oxide, one molecular weight of silica. It is preferable that there should also be added to the mixture sufficient alkali metal oxide, either as carbonate or caustic, to elevate the ratio of 1 alkali metal oxide to 1 alumina ($Al_2O_3$) sufficiently to facilitate leaching and prevent loss of alumina during leaching of the sintered mixture on account of loss of a small amount of alkali metal in furnacing, or by the action of carbonic acid of the air and water, either preparatory to or during the leaching, converting alkali metal oxide or calcium oxide into their respective carbonates. The absorption of such carbonic acid goes on very fast, and to the extent that it is absorbed, it lessens the amount of mono-alkali metal-aluminate that passes into the leach water, especially so when there is no excess of alkali metal oxide over and above the ratio of 1 alkali metal oxide molecule to 1 alumina molecule. In no case is it necessary to go above one and seventy-six hundredths molecules of alkali metal oxide to 1 molecule of alumina. The upper limit of the ratio as set forth in the Bayer patents, 1.85 of alkali metal oxide to one of alumina, is operative, but is not so efficient or has not the practical economy that is necessary and that can be arrived at by employing a lower ratio, even down to the one to one ratio. If alkali earth metal oxides be present in the mineral or minerals to which lime or its equivalent is added, allowance must be made therefor, and less lime added in order to secure the ratio of two calcium oxide to one silica in the product. Other alkali earth metal oxides or carbonates, either in the lime or in the alkali-silico aluminate material, should be treated as though they were calcium compounds in forming the calculation for the mixture. An excess of lime in the mixture results during leaching, in the formation of insoluble calcium aluminate, thus interfering with high recovery. On the other hand too much silica in the mixture results in leaving in the residue insoluble hydrated aluminum alkali metal silicate, which interferes with the extraction of alumina in leaching. In all cases the mixture should be ground fine enough so that, according to the length of time it is submitted to heat to secure sintering or fusion it will give a uniformly converted product. Some moisture added to this finely ground mixture is advantageous, especially if the operation is carried on in a rotary furnace, and when there is an alkali metal carbonate in the mixture, it especially tends to nodulize the fine material in the furnace and the lighter dusts are therefore, not blown away. Should it be found in practice that there is more dust of certain materials blown out of the furnace than of others, compensation for this should be made in forming the mixture. The temperature of sintering varies somewhat with the nature of the alkali metal oxide present in the mixture, ranging, when sodium oxide is a component of the mixture between 1100–1300° C. But with potassium or lithium oxide, the temperature will vary slightly from this, these oxides giving more easily fusible products. At this temperature a friable, porous, non-vitreous sinter is obtained in excellent condition for leaching. The temperature may be raised and the mass fused, and still the product can be very efficiently leached. The charge does not tend to adhere to the lining of a rotary kiln lined with highly basic bricks such as magnesite in practice, and works at a lower temperature about 150° C., lower than in the practice of making hydraulic cement. The raw product from the rotary furnace can be used to spread on the land as a fertilizer.

My process can be used where in the resultant product there is but one molecule of the alkali metal oxide to one molecule of ortho-silicate of calcium, or di-calcium silicate, which latter is insoluble and from which the mono sodium aluminate may be leached. When, however, this mixture is used the recovery of alumina, due to loss of alkali metal oxide in furnacing and to the absorption of carbonic acid during the leaching process, is lessened, as there is not quite enough alkali metal oxide to combine with all the alumina, and where less than one molecule of alkali metal oxide to one molecule of alumina is employed in the mixture, the efficiency of the process increasingly diminishes with such diminution of the alkali metal oxide.

In the Bayer patent of 1894, the ratio of $Al_2O_3$ to $Na_2O$ is set forth as 1 $Al_2O_3$ to 1.75 or 1.85 Na$_2$O. This would imply for my process, in the sintered product ready for leaching an equal ratio of alumina to sodium oxide. But, I have found that such is not necessary, and especially so, if in the leaching a lye is employed consisting of a pure caustic alkali, or an alkali containing 5 or more molecules of sodium metal oxide or potassium metal oxide to one molecule of alumina. In this case the ratio of Na$_2$O in the sintered product to alumina can fall below a ratio of one and one. Whenever I speak of adding the carbonate of an alkali metal to the charge fed to the rotary furnace, it is to be noted that a pure alkali, such as caustic soda, or caustic potash can be used, or even an alkali metal oxide containing a little alumina, if the whole mix be properly proportioned as to the ratio of two molecules of lime to one molecule of silica. Pure lime or limestone works best, and calcium carbonate is the cheapest and hence is the preferable mixture. It may contain magnesia but when the magnesium carbonate or magnesium oxide is too high, I find that it does not work so well. Hence, of all the alkali earth metal oxides that are stated to be equivalent to lime, I prefer lime and only such other alkali metal oxides as work satisfactorily and which do not form, under leaching, an alkali earth metal aluminate, but forms a di-alkali earth metal silicate, or ortho-silicate of an alkali earth metal. It is when these insoluble di-alkali earth metal silicates are formed that the process works at maximum efficiency.

If as a source of calcium oxide in the mixture, I employ calcium chloride and use a lower heat at first passing sufficient steam over the mixture to convert the calcium chloride into calcium oxide, and then elevate the temperature to effect complete sintering, I find, in carrying out the process in this manner that there is a tendency for the alkali metal chloride to pass out of the furnace with the hydrochloric acid fumes. Hence, in this instance, a sufficient quantity of alkali metal carbonate should be added to the initial mixture to leave in the sintered product sufficient alkali metal oxide to permit leaching out of the alkali metal aluminate.

I have found calcium chloride may be mixed with clay and carbon and subjected to temperatures ranging from 1500° to 2000° F., vapor of water being blown over and through this heated mixture, under conditions where such a large surface area of the clay is exposed to the action of the vapor of water and alkali earth metal salt that the acid radical of said salt will pass off with the fuel gases as HCl and may be condensed or utilized in the production of salts of other bases, or as pure acids, and the product secured as a solid from this step may contain one or more molecules of calcium oxide to one molecule of alumina and two or more molecules of the silica from the clay employed. And knowing the composition of this product, it may be mixed with either or both sodium carbonate and calcium carbonate (or potassium carbonate may be used in lieu of sodium carbonate), so that the ground mixture formed shall contain one or one and a fraction molecules of alkali metal oxide (but not up to the amount of alkali metal oxide suggested in the Kayser patent before mentioned) to one molecule of alumina, and two molecules of calcium oxide, or its equivalent to one molecule of silica. The latter ratio should be as exact as the mixture can be proportioned. This mixture may now be preferably passed through a furnace of the rotary type and sintered, preferably at a temperature just below its melting point, in which case there is procured a product from which the alkali metal aluminate is in proper form for leaching, and which will give an alkali metal aluminate best suited for the economical separation of oxide of aluminum of maximum pureness.

I am aware of the Kayser patent mentioned hereinbefore, and disclaim the invention therein disclosed. I am also aware that excessive amounts of sodium carbonate in the presence of lime have been commonly used to form fusions to render silicates soluble in the chemical practice of ordinary analyses. I am aware that calcium chloride in small quantities has been used to nodulize ground feldspar. But, in such work the amount of calcium chloride employed was not sufficient to furnish two molecules of calcium to one molecule of silica in the finished product, and when operated in a rotary furnace, potassium chloride volatilizes away, removing it from the alkali metal alumina silicate. I am also aware of the process of sintering ferruginous bauxite with excessive amounts of soda carbonate to form sodic aluminate, but here lime was not employed and therefore silicious types of bauxites could not be utilized as in my process. I disclaim each and all of these as being within the range of my invention.

I have leached over eighty-five per cent of the alumina from the sinters above described, and higher percentages can be secured.

Having thus fully set forth my invention and the manner in which it is to be carried out, what I claim is:

1. A process of treating leucite, feldspar and like alkali-alumina-silicates, which consists in subjecting them to a sintering process with such proportions of sodium metal carbonate and an alkali earth metal carbonate as will give a sintered product containing one molecular weight of silica to two molecular weights of alkali earth oxide and less than one and seventy-six hundredths molecular weights of alkali metal oxide to one of alumina, and leaching the sintered product.

2. The process of securing alumina from compounds containing alkali metal oxide which comprises forming an alkali silico aluminate from a mixture of clay and salt, adding thereto lime in such proportions that the mixture when sintered shall contain two molecular weight proportions of lime to one molecular weight proportion of silica and less than one and seventy-six hundredths molecular weight proportions of alkali metal oxide to one of alumina, heating the mixture until di-calcium silicate forms and dissolving alkali aluminate from the product of such heating.

3. The process of treating mixtures and compounds having substantially the composition of leucite, which consists in grinding them with such amounts of lime, that for each molecular weight of silica there shall be present two molecular weights of lime and for each molecular weight of alumina substantially one molecular weight of the alkali oxide, adding thereto less than seventy-six hundredths of an alkali metal carbonate molecule, sintering the resulting mixture, leaching out with water sodic aluminate and treating the liquor so secured.

4. A furnace charge mixture so compounded that after grinding and furnacing it shall contain two molecules of lime to one of silica and less than one and seventy-six hundredths molecules of alkali metal oxide to one of alumina, together with such impurities, as iron oxide, as do not affect the leaching and recovering nearly all its alkali aluminates, substantially as set forth.

5. The process of separating alumina from silica which consists in furnacing a mixture containing alumina, silica, an alkali metal oxide and lime in the proportion of two molecular weights of lime to one of silica and less than one and seventy-six hundredths molecular weight proportions of the alkali metal oxide radical to one of alumina, dissolving out the alkali aluminates thus formed and recovering the alumina from the solution.

6. The process of separating alumina from silica, which consists in furnacing a mixture, containing alumina, silica, lime and sodium metal oxide in the proportion of two molecules of lime to one molecule of silica and less than one and seventy-six hundredths molecules of sodium oxide to one molecule of alumina, to a temperature where di-calcium silicate forms and leaching out aluminate of soda thereby formed.

7. The method of separating alumina from silica which consists in grinding the mineral leucite with lime in such proportions that in the mixture thus produced there shall be eight molecular equivalents of lime to four molecular equivalents of silica, adding to this mixture less than one and seventy-six hundredths of an alkali metal carbonate molecule to one of alumina, sintering and recovering the alumina.

8. The herein described process for separating sodium-aluminate from sodium-silico-aluminate, which consists in adding to said material two molecules of calcium carbonate to each single molecule of silica it contains and sufficient alkali metal carbonate to give to one molecular weight of alumina less than one and seventy-six hundredths molecular weight proportions of sodium oxide to render the final product leachable with water, sintering said mixture and dissolving sodium aluminate therefrom.

9. The process of obtaining alumina from its combinations with silica, which consists in forming a sintered product containing two molecular weights of lime to one of silica and less than one and seventy-six hundredths molecules of sodium oxide to one of alumina, dissolving sodium aluminate from the product thus obtained and separating alumina contained in the final liquor.

10. The process of obtaining alumina from its silicates which consists in forming a sintered product containing two molecular weights of lime to one molecular weight of silica and less than one and seventy-six hundredths molecular weights of alkali metal oxide to one of alumina, dissolving from the product thus obtained alkali metal aluminate and separating alumina from said alkali metal aluminate in the liquor thus obtained.

11. A furnace charge mixture containing after preparation substantially two molecules of lime to one of silica and less than one and seventy-six hundredths molecules of alkali metal oxide to one of alumina, with its silica content low, to render the furnace product less bulky for leaching and basic impurities that combine with silica allowed for by lessening the lime silica ratio aforementioned, for use for furnacing and dissolving alkali metal aluminate therefrom and separating alumina from the solution so obtained.

12. In the process of extracting alkali and alumina from mixtures and compounds containing them and having lime and silica in a two to one molecular ratio and wherein the ratio of alkali metal oxide to alumina may range widely below a ratio of one and seventy-six hundredths to one, before furnacing, such ratio to be adjusted to any alkali requirements of the solvent to be thereafter used, the step involving the selection of materials of low silica content to prevent loss of alkali metal aluminate by rendering less bulky the insoluble product left after alkali metal aluminate has been dissolved therefrom.

13. In the process of extracting alkali and alumina from mixtures and compounds containing them together with lime and silica in a two to one molecular ratio, wherein the ratio of alkali metal oxide to alumina may range broadly below the ratio of one and seventy-six hundredths molecules to one, such ratio to be adjusted to any alkali requirements of the solvent to be thereafter used, the step involving lowering the molecular ratio of lime to silica below a two to one ratio in forming the mixture for furnacing and thereby making allowance for basic impurities in the mixture which substitute themselves for lime in their combination with silica to form in the final product the equivalent of di-calcium silicate.

Signed at Sewaren, in the county of Middlesex and State of New Jersey, this 16th day of November A. D. 1915.

ALFRED H. COWLES.

Witnesses:
ALFRED W. SCHMIDT,
CHAS. E. GIFFORD.

Certificate of Correction.

It is hereby certified that the name of the assignee in Letters Patent No. 1,508,777, granted September 16, 1924, upon the application of Alfred H. Cowles, of Sewaren, New Jersey, for an improvement in "Processes for Producing and Utilizing Alkalies and Alumina," should have been written and printed *The Electric Smelting & Aluminum Company*, instead of "The Electric Smelting & Aluminium Company," as shown by the record of assignment in this office; in the printed specification, page 2, line 75, for "14" after "(Na$_2$O)" read *1.4;* page 3, line 25, before the word "one" insert the word *to;* page 4, line 51, strike out the word "of" and insert the same before the word "leaching" in the same line; and that the said Letters Patent should be read with these corrections therein that the same may conform to the record of the case in the Patent Office.

Signed and sealed this 4th day of November, A. D. 1924.

[SEAL.]

KARL FENNING,
*Acting Commissioner of Patents.*